United States Patent [19]
Armstrong

[11] Patent Number: 4,795,667
[45] Date of Patent: Jan. 3, 1989

[54] VEHICLE WINDOW ASSEMBLY HAVING A RETENTION SHIELD AND METHOD AND APPARATUS FOR PRODUCING SAME

[75] Inventor: George H. Armstrong, Holland, Ohio

[73] Assignee: Libbey-Owens-Ford Co., Toledo, Ohio

[21] Appl. No.: 858,127

[22] Filed: May 1, 1986

[51] Int. Cl.$^4$ .................. B32B 17/10; B32B 27/40; B29C 45/16; B29C 45/37

[52] U.S. Cl. .......................... 428/77; 52/203; 249/95; 264/254; 264/275; 264/278; 264/279; 264/328.6; 296/85; 427/165; 428/174; 428/210; 428/425.6

[58] Field of Search .................. 264/259, 271.1, 263, 264/246, 250, 254, 275, 278, 279, 328.6; 249/95; 427/165, 168; 296/84 R, 95 C, 85; 428/437, 213, 216, 77, 174, 210, 425.6; 425/543

[56] References Cited

U.S. PATENT DOCUMENTS

| | | | |
|---|---|---|---|
| 2,205,020 | 6/1940 | Ryan | 428/437 |
| 2,279,145 | 4/1942 | Ryan | 428/437 |
| 3,021,227 | 2/1962 | Richardson | 427/168 X |
| 3,037,810 | 6/1962 | Kelley | 264/263 X |
| 3,381,340 | 5/1968 | Chapin, Jr. | 264/275 X |
| 3,427,770 | 2/1969 | Kunert et al. | 296/84 R X |
| 3,764,178 | 10/1973 | Krings et al. | 296/84 R |
| 3,935,367 | 1/1976 | Merrill et al. | 427/165 X |
| 3,979,548 | 9/1976 | Schäfer et al. | 427/165 X |
| 4,027,061 | 5/1977 | Cartier et al. | 428/437 X |
| 4,076,788 | 2/1978 | Ditto | 264/246 X |
| 4,110,393 | 8/1978 | Trame | 264/246 X |
| 4,136,214 | 1/1979 | Bourelier et al. | 427/165 X |
| 4,151,696 | 5/1979 | Knights et al. | 264/271.1 X |
| 4,161,060 | 7/1979 | Lenne et al. | 264/271.1 X |
| 4,232,080 | 11/1980 | Orain et al. | 428/437 X |
| 4,239,808 | 12/1980 | Arnason | 264/250 X |
| 4,242,403 | 12/1980 | Mattimoe et al. | 428/216 X |
| 4,259,135 | 3/1981 | Kulla | 264/263 X |
| 4,541,881 | 9/1985 | Sebastiano | 296/84 R X |
| 4,561,625 | 12/1985 | Weaver | 264/252 X |
| 4,584,155 | 4/1986 | Zanella | 264/259 X |
| 4,657,796 | 4/1987 | Musil et al. | 427/165 X |
| 4,688,752 | 8/1987 | Barteck et al. | 249/95 X |

FOREIGN PATENT DOCUMENTS

| | | | |
|---|---|---|---|
| 1046841 | 12/1958 | Fed. Rep. of Germany | 427/165 |
| 56-53032 | 5/1981 | Japan | 264/279 |
| 58-177335 | 10/1983 | Japan | 264/275 |
| 1436884 | 5/1976 | United Kingdom | 428/437 |

OTHER PUBLICATIONS

*Whittington's Dictionary of Plastics* by Lloyd R. Whittington, Stamford, Conn., Technomic, ©1968, Preface; pp. 59–60.

Primary Examiner—Philip Anderson
Attorney, Agent, or Firm—Marshall & Melhorn

[57] ABSTRACT

The present invention relates to a window assembly including a transparent sheet having a layer of retention material adhered thereto, and a method and apparatus for producing such a window assembly. The apparatus includes at least two cooperating mold sections having facing surfaces defining a chamber for receiving the transparent sheet which can be shaped for use as a vehicle backlight. A seal is positioned about a periphery of a predetermined area on a surface of the transparent sheet on which the film is to be formed. The seal, the predetermined surface area of the transparent sheet and the mold define a forming cavity into which is injected a thermosetting polyurethane material. The material is at least partially cured in the cavity. Thereafter, the window assembly is removed from the mold chamber with a polyurethane retention shield adhered to the predetermined surface area.

9 Claims, 2 Drawing Sheets

VEHICLE WINDOW ASSEMBLY HAVING A RETENTION SHIELD AND METHOD AND APPARATUS FOR PRODUCING SAME

BACKGROUND OF THE INVENTION

The present invention relates generally to a method and apparatus for applying a plastic material to a transparent sheet, e.g., glass, and, particularly, to a method and apparatus for producing a unique retention shield window assembly which can be used, for example, as a backlight in automotive vehicles.

In the early stages of the automobile industry, single sheets of ordinary glass were employed as windshields, side windows and backlights. As it became evident that this type of glass utilized as a windshield presented a considerable safety hazard, the single sheets of ordinary glass were replaced with single sheets of heat treated or tempered glass. Thereafter, as laminated safety glass was developed to reduce the severity of lacerative injuries, its use in automotive windshields greatly increased until today, when almost all automotive windshields are constructed of some type of laminated glass.

Typically, laminated glass of the type utilized in vehicle windshields consists of two sheets of glass bonded together with a thin plastic interlayer, such as a sheet of polyvinyl butyral for example. In the event of an impact on a laminated glass windshield sufficient to break glass, the plastic interlayer functions to bind the glass fragments together, thus reducing the risk of injury of a driver or passenger as a result of flying glass or contact with the windshield. Further developments of this type of laminated glass, such as those disclosed in U.S. Pat. No. 3,231,461, have resulted in laminated windshields with improved penetration resistance.

As a result of the evergrowing recognition of the necessity for increased safety precautions, continuing efforts have been and are still being made to appreciably reduce the injury producing potential of automobile windows. Side windows and backlights typically have been formed of a single sheet of tempered glass. As the automobile stylists seek to increase the glass area in vehicles, backlights are becoming more complex in shape and are extending over the passenger area. Thus, it has become more important to increase the penetration resistance of backlights to objects impacting the backlight from either the outside or the inside.

Recently, it has been found that the addition of a second plastic layer bonded to the inner glass surface of the laminated windshield further increases the safety effectiveness of the windshield. An example of an automotive windshield which incorporates, as part of its laminated structure, a protective laceration shield bonded to its inboard glass surface is disclosed in U.S. Pat. No. 4,242,403. In this patent, the laceration shield includes a penetration resisting multi-layer body consisting of an inner layer of relatively soft, extensible plastic material such as polyvinyl butyral, for example, which is adhered to the inboard surface of the windshield, an intermediate layer of more durable plastic such as polyester, and an outer coating of an abrasion resistant material.

One method for applying a plastic layer to one surface of a single sheet of glass is disclosed in U.S. Pat. No. 3,806,387. In this method, a sheet of glass, a layer of adhesive, and a layer of thin transparent plastic sheeting are assembled in a stack to produce a laminated assembly. A second sheet of glass (called a glass cover or forming sheet) conforming to the configuration of the sheet of glass in the laminated assembly is then placed on top of the plastic sheet. The surface of the glass forming sheet which is placed adjacent the plastic sheet is coated with a demolding agent to prevent any adhesion between the glass forming sheet and the plastic sheet. Typically the glass forming sheet is made on the same form as the glass sheet of the laminated assembly. Next, the space between the individual laminae are evacuated and the laminated assembly is positioned in an autoclave. The autoclave applies pressure to the exterior surfaces of the laminated assembly while heating the assembly to a temperature which causes bonding between the glass sheet and the plastic sheet. After the assembly is removed from the autoclave, the forming sheet can be removed from the stack.

SUMMARY OF THE INVENTION

The present invention concerns a retention shield window assembly which can be used as a vehicle backlight, for example, and a method and apparatus for producing such a window assembly. In the method of the present invention, a formed backlight is positioned in a mold having a molding space or cavity configured to form a plastic layer on a predetermined interior area of the backlight. The mold is then closed and a thermosetting polyurethane material injected. When the mold has been filled, the polyurethane material sets up and cures or at least partially cures and the window assembly is removed from the mold chamber with a polyurethane retention shield adhered to the predetermined surface area.

BRIEF DESCRIPTION OF THE DRAWINGS

The above, as well as other advantages of the present invention, will become readily apparent to one skilled in the art from reading the following description of the invention in conjunction with the attached drawings, in which:

FIG. 1b is a cross-sectional view taken along the line 1b—1b of FIG. 1a.

DESCRIPTION OF THE PREFERRED EMBODIMENT

Figure 1A:
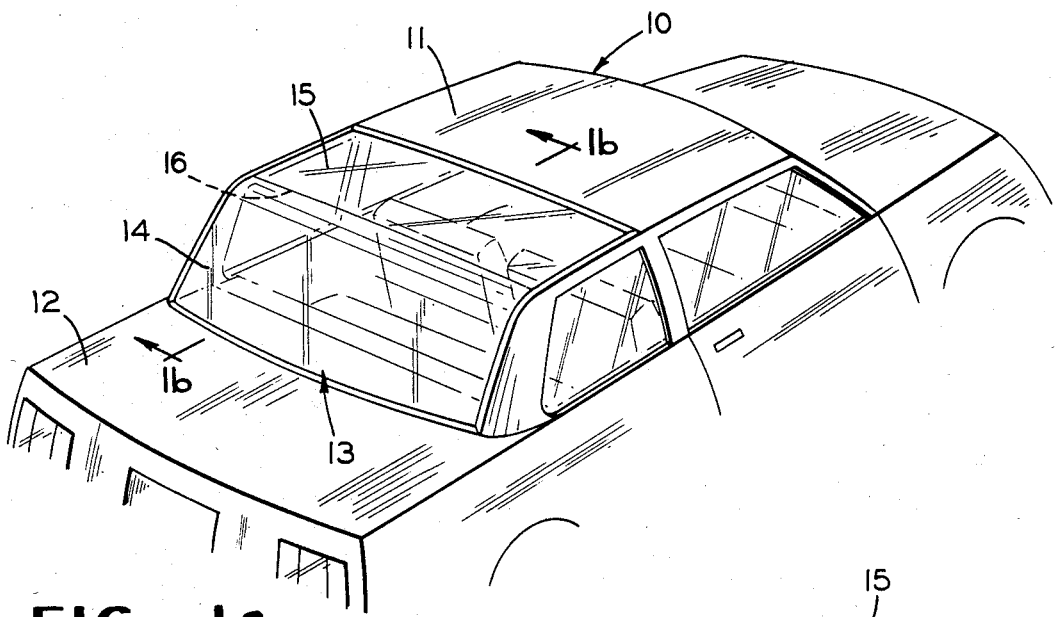
FIG. 1a is a perspective view of a vehicle having a backlight including a retention shield according to the present invention.
Figure 1B:
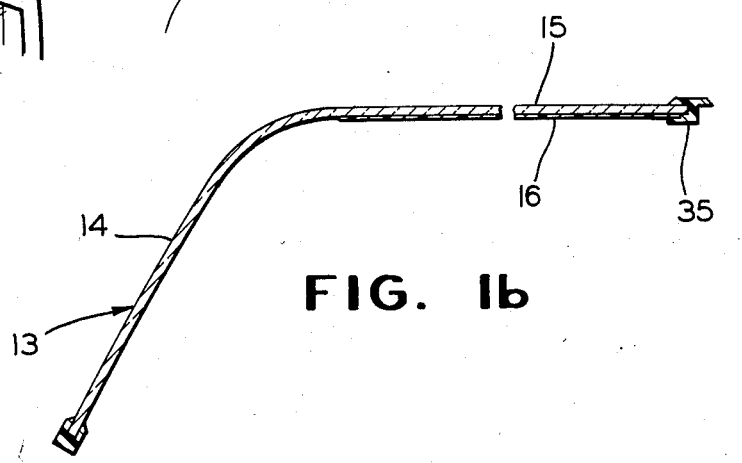

There is shown in FIG. 1a, a perspective view of a passenger vehicle 10 having a roof area 11 and a trunk lid 12. A backlight 13, preferably composed of a transparent sheet of tempered glass, is inserted in an opening formed between the roof 11 and trunk lid 12 to enclose a portion of the passenger carrying area of the vehicle 10. The backlight 13 has a substantially vertical portion 14 extending upwardly from the trunk lid 12 to connect with a substantially horizontal portion 15 which is connected with the roof 11. It has been found desirable to provide a portion of the backlight 13 with a retention shield. For example, as shown in FIG. 1b, a portion of the interior surface of the horizontal portion 15 can be covered with a retention shield 16. Thus, the area of the backlight 13 which extends over the passenger carrying area of the vehicle has increased penetration resistance due to the shield 16.

Figure 2:
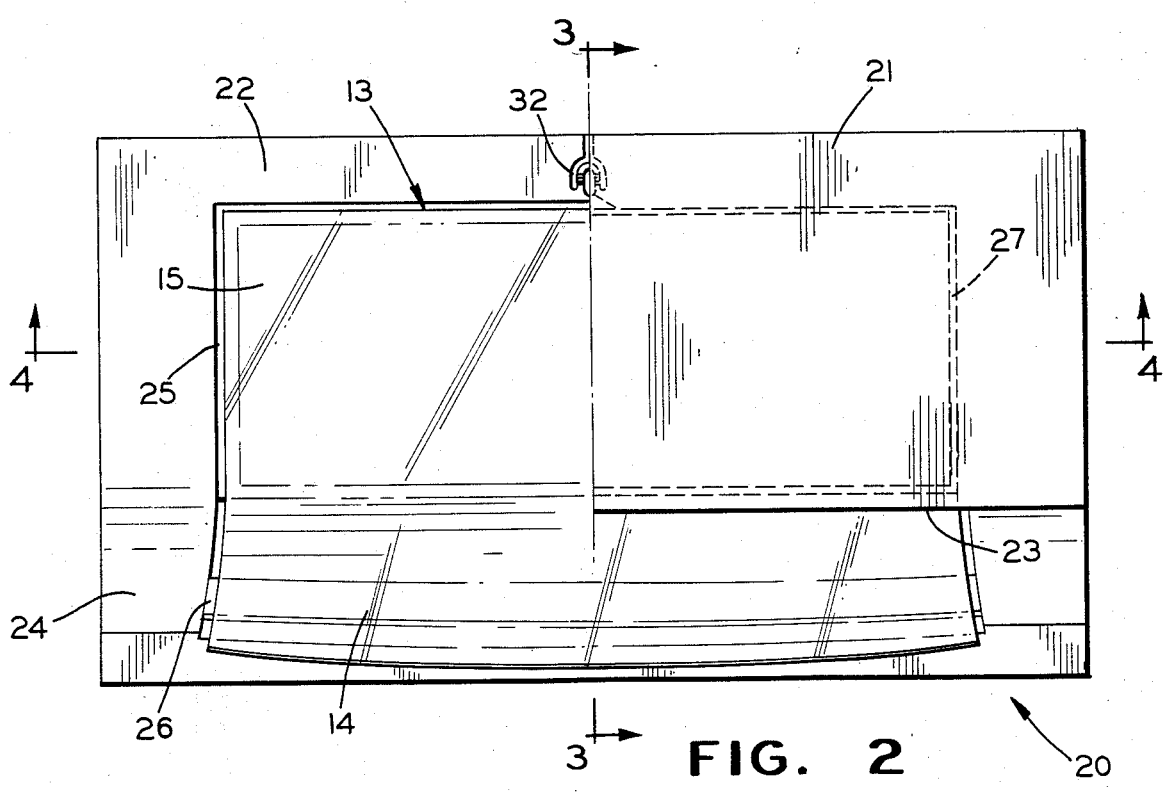
FIG. 2 is a plan view of a mold assembly with the left half of the upper mold removed to show a backlight for applying a retention shield according to the present invention.
Figure 3:
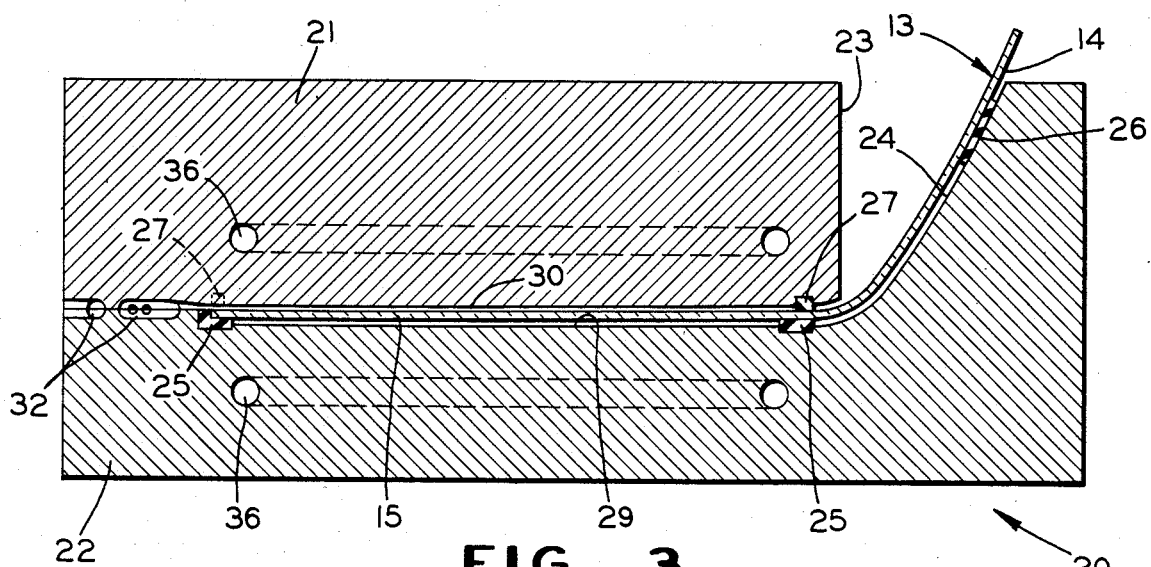
FIG. 3 is a cross-sectional view taken along the line 3—3 in FIG. 2.

There is shown in FIGS. 2 through 6 a mold structure 20 for forming a backlight in accordance with the method and apparatus of the present invention. The mold 20 has an upper half 21 and a lower half 22. In FIG. 2, the left hand side of the upper half 21 has been removed to show the backlight 13 in position in between the mold halves 21 and 22. The horizontal portion 15 of the backlight 13 is positioned between the two mold halves and the vertical portion 14 of the backlight extends upwardly through an opening between the mold halves. The opening is formed or defined between a generally vertical side surface 23 of the upper mold half 21 and a generally curved surface 24 of the lower mold half 22. The surface 24 follows the contour and angle of the vertical portion 14 of the backlight 13.

Suitable means (not shown) are provided to open and close the mold halves 21 and 22. When the mold halves are open, the backlight 13 is positioned on the upper surface of the lower half 22 so that portions of the downwardly facing surface of the glass rest on appropriately positioned pads or seals 25. The lower mold half 22 is also provided with a pad 26 adjacent the upper edge of the surface 24 for contacting the vertical portion 14 of the backlight. After the backlight 13 is suitably positioned on the seals 25 and the pad 26, the upper mold half 21 is lowered into position so that the outer peripheral edges of the cooperating mold halves 21 and 22 can be clamped together in metal-to-metal contact outwardly of the mold cavity. The upper mold half 21 carries pads or seals 27 which function in cooperation with the seals 25 to press yieldingly against the backlight horizontal portion 15 and retain the same within the mold cavity.

Figure 4:
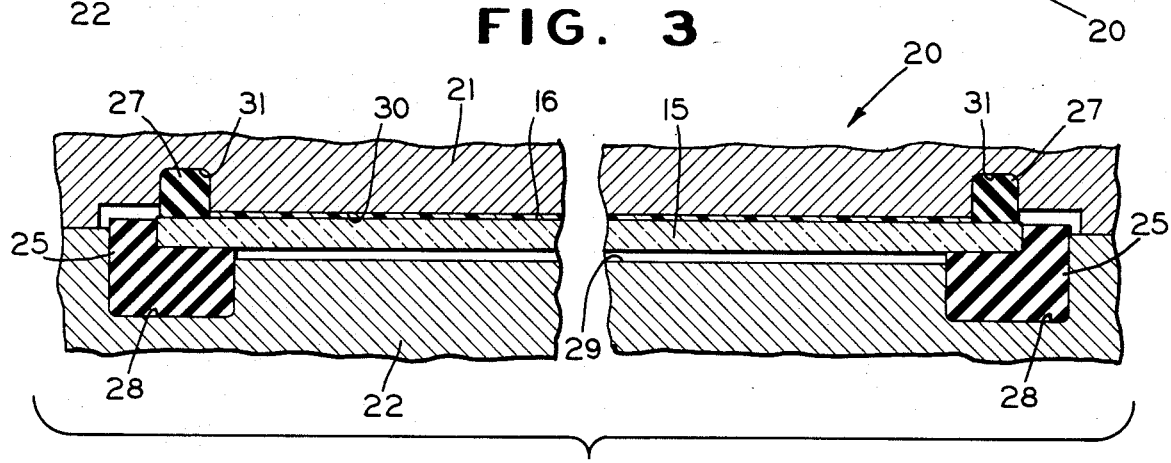
FIG. 4 is a fragmentary, enlarged cross-sectional view taken along the line 4—4 in FIG. 2.

As best shown in FIG. 4, the seals 25 are positioned in channels or grooves 28 which surround a cavity 29 formed in the upwardly facing surface of the lower mold half 22. The downwardly facing surface of the upper mold half 21 also has a cavity 30 formed therein which is surrounded by grooves 31 for retaining the seals 27. The seals 25 and 27 position the horizontal portion 15 of the backlight 13 in the cavities 29 and 30 such that the backlight portion 15 does not contact either of the mold halves. The distance between the upwardly facing surface of the backlight portion 15 and the downwardly facing surface of the cavity 30 is equal to the desired thickness of the retention shield 16.

The seals 25 and 27 are preferably formed of a silicone rubber material and can be secured within the respective grooves 28 and 31 by means of a suitable adhesive. In addition to resiliently supporting the glass sheet within the cavities, the seals 27 cooperate with selected portions of the glass sheet and the upper mold half 21 to define the shield forming cavity. It is preferred that the subsequently attached frame member or mounting gasket 35 (FIG. 1b) be securely affixed to the retention shield as well as the edge of the window assembly to provide maximum effect. Thus, it is desirable that the retention shield extend as near to the outer edge of the backlight as possible. To this end, the seals 27 at the periphery of the sheet are disposed adjacent the edge thereof and maintained at a suitable minimum width to provide maximum extension of the shield. In an alternate embodiment, the retention shield and mounting gasket may be formed at one and the same time by utilizing, for example, a RIM mold having a single cavity shaped and dimensioned to provide, i.e., form, both the shield and gasket simultaneously upon injection of polyurethane reactants, e.g., a polyol and isocyanate, into the cavity.

Figure 5:
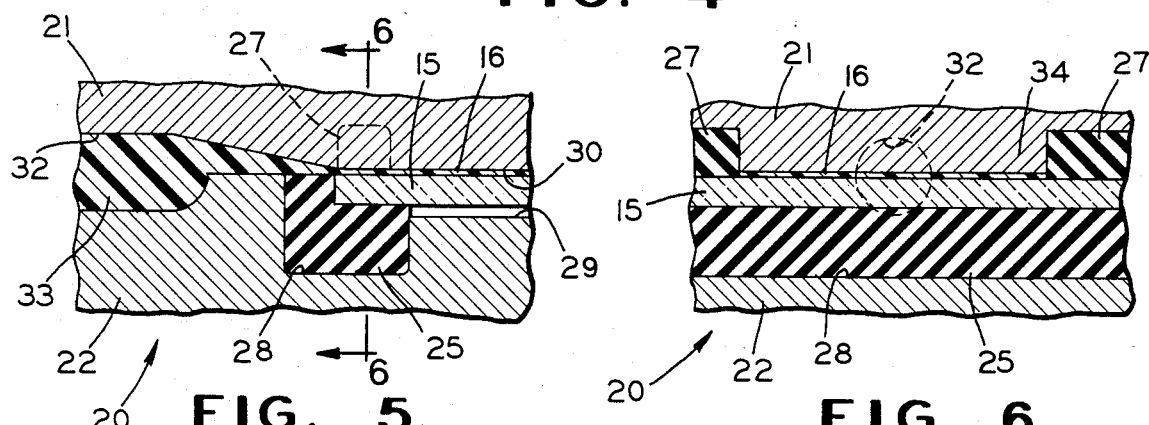
FIG. 5 is an enlarged fragmentary cross-sectional view of the nozzle area of the mold shown in FIG. 3.
Figure 6:
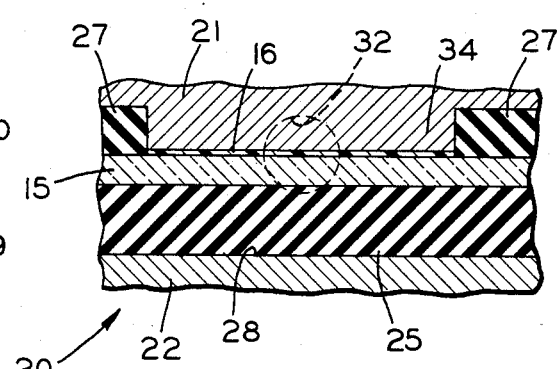
FIG. 6 is a fragmentary cross-sectional view taken along the line 6—6 in FIG. 5.

The cavity formed by the glass sheet 15, the seals 27, and the cavity 30 communicates with an inlet means or gate 32 for receiving a flowable polymeric forming material from a nozzle member (not shown). As shown in FIG. 5, the forming material 33 fills the nozzle area 32 and spreads into the cavity to form the retention shield 16 on the upwardly facing surface of the backlight portion 15. The mold and more particularly the cavity 30 is typically maintained at a temperature suitable for curing of the polymeric material 33, e.g., 140° F. to 160° F. by circulation of a fluid through passageways 36 provided in both mold halves. As shown in FIG. 6, the seal 27 is interrupted by a downwardly extending portion 34 of the upper mold half 21 in the area of the gate 32 to permit the communication between the gate 32 and the shield forming cavity.

Figure 7:
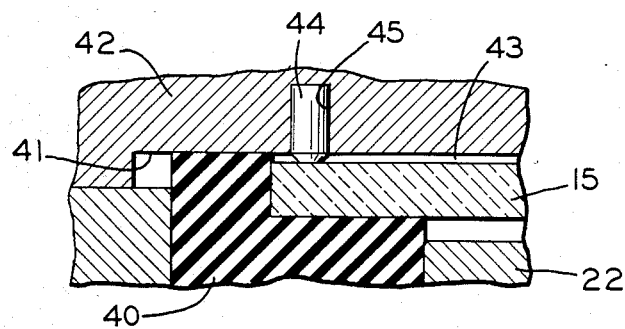
FIG. 7 is an alternate embodiment of a seal structure shown in the left hand portion of FIG. 4.

There is shown in FIG. 7 an alternate embodiment of a mold assembly for forming the shield to the edge of the backlight portion 15. The lower mold half 22 has a seal 40 retained therein which extends into contact with a downwardly facing surface 41 of an upper mold half 42. The upper surface of the backlight portion 15, the seal 40, and the downwardly facing surface 41 define a cavity 43 for forming a retention shield therein. A downwardly extending pin 44 is retained in an aperture 45 formed in the upper mold half 42. The lower end of the pin 44 contacts an upper surface of the backlight portion 15 to space the upper surface of the backlight portion 15 from the downwardly facing surface 41 to obtain the proper dimension or thickness for the shield. Thus, the pin 44 performs the function of the seal 27 of the original embodiment. When the forming material is inserted into the cavity 43, the shield will extend to the edges of the backlight portion 15 with the exception of small areas where one or more of the pins 44 contacts the surface of the backlight portion 15.

The retention shield 16 does not have to be optically clear, but it must be ultraviolet stable. Thus, a suitable forming material may be a polyurethane made using aliphatic diisocyanates. The liquid reactants are injected into the mold cavity such as by a reaction injection molding (RIM) process and are cured to a polymeric film. This is in contrast to the prior art method of applying film in cured form to the glass and utilizing heat and vacuum to laminate the film to the glass.

Thermoset polyurethanes are tough, relatively optically clear, solvent and abrasion resistant, and light stable. In a typical vehicle application, the shield 16 can be approximately twenty-four inches wide, front to back, and approximately forty thousandths of an inch (0.040") thick. The polyurethane material has a viscosity low enough to permit rapid and uniform filling of the relatively thin forming cavity and a reactivity sufficient to cure in a relatively short time. Two materials which have been found to be satisfactory are, first, one obtained from Development Associates, North Kingston, R.I., under the designation "clear polyurethane AL-1082, part A and part B", and, secondly, one obtained from Colorim Systems, LaPorte, Ind. under the designation Polyfast 500 and Isofast 500. Prior to insertion into the molds, the backlight surfaces which are not to be coated with the shield are primed with a conventional mold release agent.

In accordance with the provisions of the patent statutes, the principle and mode of operation of the present invention have been described in what is considered to represent the preferred embodiment. However, it should be understood that the invention may be practiced otherwise than as specifically illustrated and described without departing from the spirit or scope of the attached claims.

What is claimed is:

1. A window assembly adapted to be mounted in an opening provided in a vehicle comprising:
    a sheet of transparent material, said sheet being formed to include a generally horizontal first major portion adapted to extend over a passenger compartment of the vehicle, and a second major portion extending downwardly from said first portion;
    a retention shield provided on and adhered over a predetermined large area on only the inboard surface of said first major portion of said sheet, said retention shield composed of a synthetic polymer and having been polymerized in situ on the inboard surface of the sheet.

2. A window assembly as defined in claim 1, wherein said retention shield is composed of polyurethane.

3. A window assembly as defined in claim 1, wherein said sheet of transparent material is glass.

4. A window assembly as defined in claim 3, wherein said glass is tempered.

5. A method of producing a vehicle window assembly including a transparent sheet of frangible material such as glass having a layer of plastic material adhered over a substantial area of a major surface thereof, said method including the steps of:
    (a) positioning a sheet of transparent frangible material within the interior of a mold chamber upon a peripheral seal supporting said sheet with its one major surface spaced from an adjacent first wall of said mold chamber;
    (b) sealing the periphery of a predetermined large area of the other major surface of said transparent sheet material to form a cavity between a second wall of the mold chamber and said other major surface of the transparent sheet material;
    (c) injecting a flowable thermosetting polymeric forming material into said cavity;
    (d) at least partially curing said thermosetting polymeric forming material in said cavity to form a layer on said predetermined area of said other major surface; and
    (e) removing the window assembly from the mold chamber.

6. The method according to claim 5 wherein said transparent sheet of material is glass.

7. The method according to claim 6, wherein said glass is tempered.

8. A mold structure for producing a window assembly including a transparent sheet of frangible material such as glass having a retention shield adhered thereto, said mold structure comprising:
    at least two cooperating mold sections having facing surfaces defining a chamber for receiving a transparent sheet of frangible material, one of said mold sections including a peripheral seal for supporting said transparent sheet with its one major surface spaced from the facing surface of said one mold section, the facing surface of the other of said mold sections being provided with a forming portion which cooperates with a predetermined area on the other major surface of said transparent sheet to define a forming cavity;
    seal means extending about the periphery of said predetermined area;
    inlet means for introducing a flowable thermosetting polyurethane material into said forming cavity; and
    means for maintaining said forming cavity at a temperature suitable to initiate care of said polyurethane material to form a retention shield adhered to said surface of said transparent sheet in said predetermined area.

9. A mold structure as claimed in claim 8, including at least one pin extending from said facing surface forming portion into contact with said predetermined area or defining the thickness of said retention shield.

* * * * *